United States Patent [19]

Field

[11] Patent Number: 4,474,354
[45] Date of Patent: Oct. 2, 1984

[54] TUMBLER HOLDER

[76] Inventor: Stanley R. Field, 2712 W. 225th St., Torrance, Calif. 90505

[21] Appl. No.: 417,432

[22] Filed: Sep. 13, 1982

[51] Int. Cl.³ ............................................ F16M 13/00
[52] U.S. Cl. ...................... 248/596; 211/81;
   248/284; 248/311.2; 248/580; 248/635;
   403/228
[58] Field of Search ............... 248/635, 567, 580, 596,
   248/311.2, 291, 284; 403/332, 326, 327, 224,
   228, 289; 211/81

[56] References Cited

U.S. PATENT DOCUMENTS

| | | | |
|---|---|---|---|
| 2,208,532 | 7/1940 | Woodward | 248/635 |
| 2,361,184 | 10/1944 | Ellis et al. | 248/635 |
| 2,520,757 | 8/1950 | Cain | 248/635 X |
| 2,644,978 | 7/1953 | Becker | 403/322 X |
| 2,893,675 | 7/1959 | Smith et al. | 248/311.2 X |
| 2,926,879 | 3/1960 | Dietrich | 248/311.2 |
| 2,940,785 | 6/1960 | Hausalter | 403/224 |
| 3,045,962 | 7/1962 | Paulus | 211/81 X |
| 3,413,021 | 11/1968 | Potts | 403/289 X |
| 3,840,204 | 10/1974 | Thomas et al. | 248/311.2 |
| 3,842,981 | 10/1974 | Lambert | 248/311.2 |
| 3,980,264 | 9/1976 | Tomasik | 248/311.2 X |
| 4,191,350 | 3/1980 | Ormond | 248/311.2 X |
| 4,196,691 | 4/1980 | Imazeki | 403/289 X |

FOREIGN PATENT DOCUMENTS 2010664  7/1979  United Kingdom .................. 248/1

Primary Examiner—Ramon S. Britts
Assistant Examiner—David L. Talbott
Attorney, Agent, or Firm—Don B. Finkelstein

[57] ABSTRACT

A gimbaled cup supporting device for holding cups in a level position in a moving vehicle while at the same time isolating the cup from shock and vibration transmitted from the moving vehicle to the support mechanism. A shock absorber is described in which the central portion supports a collar and shaft attached to the cup holding mechanism and an annular ring portion displaced from the central portion is attached to a supporting shaft that is removably attached to the supporting vehicle. The rubber shock absorber isolates the supporting shaft from the gimbaled cup supporter while supporting it in the conventional manner.

7 Claims, 4 Drawing Figures

TUMBLER HOLDER

This invention relates to an improved tumbler holder for holding liquids in a moving vehicle, and more particularly to a shock absorber device for holding a gimbaled cup holder that cushions the effect of high acceleration, turns and bumpiness associated with a moving vehicle.

In today's fast moving society it has become more fashionable for operators of cars, trucks, boats and the like to consume beverages and food while in a moving environment.

The problems of supporting a cup of hot coffee by the operator or by a guest in a moving vehicle requires a certain amount of dexterity and balancing that not all of us possess. Trying to support a cup of liquid on the vehicle itself while it is either moving down a road filled with potholes or on a boat bouncing along on a lake becomes an almost impossible situation.

As a result of these diverse requirements, there has developed in the art different kinds of beverage holders constructed in the form of a pair of gimbaling devices whereby the device holds the beverage in a vertical position regardless of the gyrations of the vehicle. These devices have met with wide acceptance and do perform the function of holding a cup of liquid, whether it be in paper cups, styrofoam cups, coffee cups or the like.

Unfortunately these prior art devices are invariably directly connected to some portion of the vehicle, boat or plane which is subject to great vibration which is passed on to the cup through the gimbaled support. The shock transmitted to the vehicle as it traverses the road or waterbed has an adverse effect on the liquid being supported in the gimbaled container and while the gimbaling is accurate, the shock and vibration causes a certain amount of spilling and excess movement that limits the use of the gimbaled support and in some cases is even dangerous if hot liquid is stored in a cup being held by the gimbaled support.

U.S. Pat. No. 2,893,675 entitled Beverage Holder, issued July 7, 1959 to R. W. Smith, is an example of a gimbaled support for holding liquids. This patent clearly shows a conventional gimbal support for holding liquid in a vertical position regardless of the gyrations of the vehicle in a left, right or yawing condition. Unfortunately, the physical attachment of the gimbal support to the side of the vehicle is a direct attachment which allows all vibrations and shock to be transmitted to the liquid within the cup.

U.S. Pat. No. 2,926,879 entitled Tumbler Holder, issued March 1, 1960 to R. H. Dietrich, is another example of a gimbaled cup holder that is fixedly attached to the side of the vehicle. The Dietrich device is exemplified by a simple gimbaling device and by a very simple slide-holding technique for attaching the gimbal device to the side of the vehicle. But unfortunately the simplicity of the device also allows all shock and vibration from the vehicle to be transmitted directly to the gimbal device and hence to the liquid in the cup and with the same disastrous results.

U.S. Pat. No. 3,842,981 entitled Apparatus for Removably Holding a Liquid Beverage Container was issued Oct. 22, 1974 to Thomas A. Lambert. This patent shows still another easily removable gimbaled cup holder in the form of a tray which is easily attached to the side of a vehicle. The attachment is made with easily removed slideable male and female mating surfaces that, while easy to remove and insert, suffer the same defect of transmitting all vibrations and forces directly from the side of the vehicle to the gimbaled cup container and eventually to the liquid within the cup.

A more modern gimbaled container is shown in U.S. Pat. No. 4,191,350 entitled Storable Holder for a Container issued March 4, 1980 to William Ormond. Here again a gimbaled container is disclosed having collapsible support members for holding a cup and which is adapted to fold within the support member and thereby remove any obstruction to the user when the device is not in service. Unfortunately that portion of the gimbaled support is directly attached to the side of the vehicle and hence once again all vibration and jars and forces are passed directly to the cup located within the gimbaled support.

Until the advent of the present invention there was no device available for use with a gimbaled support that adequately provides the function of minimizing the shock and vibration passed from the vehicle itself to the gimbaled support.

In this invention there is disclosed a shock absorber for a gimbaled cup holder consisting of a tubular shaped rubber plastic material having a central opening. Located within the central opening is a hollow plastic collar that is bonded on the periphery of the collar to the rubber plastic material. A shaft rotatably mounted within said plastic collar and restrained at one end from axial movement is attached at the other end to a gimbaled cup support member.

An annular ring of material is removed from a portion of said plastic material that is coaxial with the central opening and a thin walled tubular supporting shaft is inserted within the annular ring for supporting and isolating the gimbaled cup supporting member. The other end of the thin tubular shaft is mounted directly to the supporting vehicle in a conventional manner.

The hollow plastic collar provides the function of supporting the gimbaled cup support and at the same time isolates any forces appearing on the thin walled tubular supporting shaft member from being passed directly to the gimbaled support, thereby isolating the cup held within the gimbaled support from any shock and vibration experienced by the vehicle.

Further objects and advantages of the present invention will be made by referring now to the accompanying drawing wherein.

Figure 1:
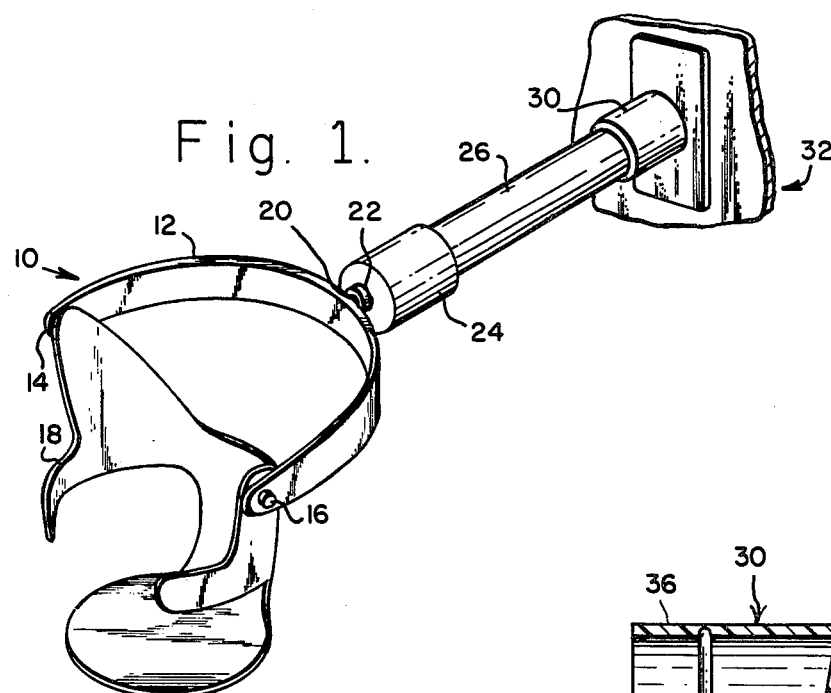
FIG. 1 is a perspective view of the invention.
Figure 3:
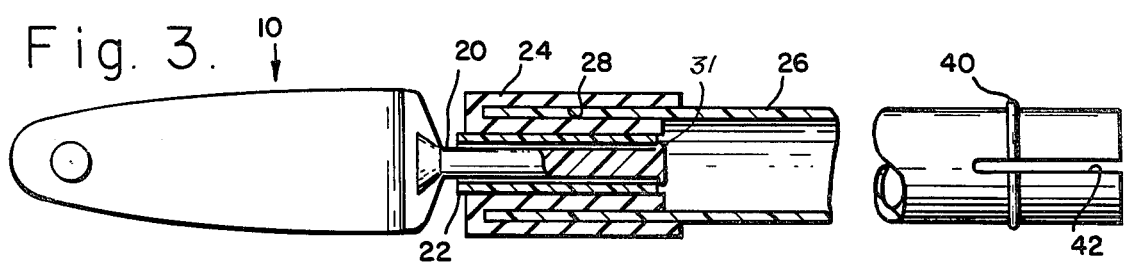
FIG. 3 is a partial cross-sectional view illustrating the shock absorber attachment.

Referring now to FIGS. 1 and 3, there is shown a gimbaled support 10 of conventional construction containing a U-shaped member 12 connected at the extremeties 14 and 16 to a cup holding device 18.

Located in the center of the U-shaped member 12 is a shaft 20 which is more fully illustrated in connection with FIG. 3. One end of shaft 20 is fixedly attached to the U-shaped member 12.

The shaft 20 is rotatably mounted within a collar 22 which is firmly and fixedly attached to a tubular shaped rubber plastic material 24 that acts as a shock absorber in supporting the cup holder 18 while at the same time preventing shock and vibration from passing through.

Shaft 20 and collar 22 are constructed of ABS hard plastic to minimize friction.

A thin walled tubular supporting shaft 26 is inserted within an annular ring 28 of the tubular material 24. The annular ring 28 consists to material removed from a portion of the tubular shaped plastic material 24, which ring is coaxial with the collar 22. The thin walled supporting shaft 26 is inserted within the annular ring 28 and thereby supports the gimbaled cup holder 18 while at the same time providing isolation from any forces transmitted through the supporting shaft 26.

The opposite end of the thin walled shaft 26 is inserted within a supporting bracket 30 that is adapted to be attached to the moving vehicle 32.

Figure 2:
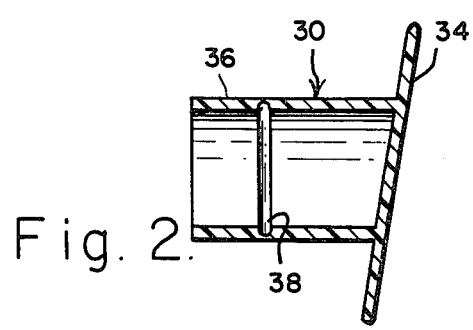
FIG. 2 is a cross-sectional view of a support member adapted to be attached to the vehicle.

Referring now to FIG. 2, there is shown a cross-sectional view of the bracket 30 and which more fully illustrates a supporting back plate 34 that is adapted to contact the moving vehicle 32. The bracket 30 is constructed of a tubular portion 36 having an internal diameter approximately equal to the outside diameter of the thin wall supporting shaft 26 to thereby provide a firm support for the gimbaled cup holder 10.

In order to obtain flexibility in mounting the bracket 30 to the moving vehicle 32, the tubular portion 36 is attached to the bracket 34 at an angle to thereby allow the user to find the most preferential position on the moving vehicle for supporting the bracket 30.

In order to ensure that the gimbaled cup holder does not vibrate loose from the bracket 30, an internal annular groove 38 is cut within the internal diameter of portion 36 which is adapted to mate with the supporting shaft 26. A corresponding ring is attached to the outside portion of the shaft 36 to mate with the groove 38.

Referring now specifically to FIG. 3, there is shown an annular ring 40 located on the periphery of the shaft 26 which is adapted to mate with the annular groove 38 located within the bracket 30.

The cooperation of the ring 40 and the groove 38 will ensure that normal vibration and forces imparted from the vehicle will not cause the supporting shaft 26 from being ejected from the bracket 30.

Located on shaft 26 and in close proximity to the annular ring 40 are a pair of slotted grooves 42 cut axially in the tube 36 and which allow the end portion of the shaft 26 to be deformed slightly when inserted into bracket 30 or removed from the bracket 30.

Shaft 20 is connected at one end to U-shaped member 12 while the other end is free to rotate in collar 22. The opposite end 31 of shaft 20 is expanded preferably by heat to a diameter approximating that of collar 22. In this manner shaft 20 is prevented from moving axially while still free to rotate.

Figure 4:
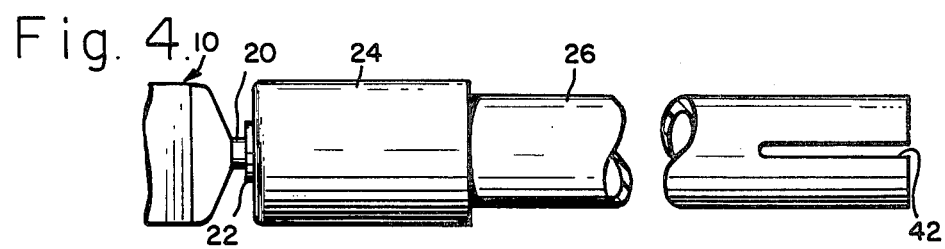
FIG. 4 illustrates another embodiment of the support member for the invention.

Referring now to FIG. 4, there is shown another embodiment of the invention but not including the annular rings 40 on the end portion of the shaft 26 near the axial slots 42. In this embodiment the shaft 26 is adapted to be inserted into the conventional cigarette lighter receptacle that is normally found in most automobiles and boats. The external diameter of the shaft 26 is chosen to be approximately equal to the internal diameter of the cigarette lighter and since the shaft 26 is plastic, there is no interaction with the electrical workings of the cigarette lighter and the depth of the lighter is such as to provide a normal support for the gimbaled cup holder.

When not in use, the cup holder can be removed from the cigarette lighter receptacle without impairing its function and in this manner does not require a separate bracket to be attached to the vehicle if the owner should not want to mar the vehicle by drilling excess holes with supporting mechanisms.

I claim:

1. A shock absorber for a gimbaled cup holder comprising:
    a tubular shaped rubber plastic material having a central opening,
    a hollow plastic collar located within said central opening and bonded on the periphery to said rubber plastic material,
    a shaft rotatably mounted within said plastic collar and restrained at one end from axial movement,
    a U-shaped member adapted to be pivotably connected at the extremities to a cup holding device and fixedly connected to the other end of said shaft,
    an annular ring of material removed from a portion of said plastic material coaxial with said central opening, and
    a thin walled tubular supporting shaft inserted at one end within said annular ring for supporting and isolating said cup holding device from shock and vibration.

2. A shock absorber for a gimbaled cup holder according to claim 1 in which said plastic collar and said shaft are constructed of ABS hard plastic material to increase strength and minimize friction.

3. A shock absorber for a gimbaled cup holder according to claim 1 in which one end of said shaft extending beyond said collar is deformed into a diameter approximating that of said collar thereby preventing said shaft from moving axially through said collar.

4. A shock absorber for a gimbaled cup holder according to claim 1 in which the radial thickness of said annular ring in said rubber plastic material is substantially equal to the radial thickness of said walled tubular shaft for supporting said cup holder.

5. A shock absorber for a gimbaled cup holder according to claim 1 in which said thin walled tubular supporting shaft is slotted axially for insertion into a mounting bracket.

6. A shock absorber for a gimbaled cup holder according to claim 5 in which said mounting bracket contains a tubular portion having an internal annular groove for mounting with said thin walled tubular supporting shaft having an external annular ring which is adapted to be inserted within said mounting bracket.

7. A shock absorber for a gimbaled cup holder according to claim 1 in which the outside diameter of said thin walled tubular supporting shaft is equal to the inside diameter of a conventional cigarette lighter receptacle whereby said shaft is adapted to nest within said lighter receptacle in a supporting relationship.

* * * * *